United States Patent [19]

Yamawaki et al.

[11] 4,065,426

[45] Dec. 27, 1977

[54] METHOD FOR THE PREPARATION OF POWDERED RUBBER

[75] Inventors: Takeshi Yamawaki, Hiratsuka; Takanori Uchida, Machida; Makoto Nakajima, Tokyo, all of Japan

[73] Assignee: Mitsubishi Chemical Industries, Ltd., Tokyo, Japan

[21] Appl. No.: 690,905

[22] Filed: May 28, 1976

[30] Foreign Application Priority Data

July 16, 1975 Japan .................................. 50-86827

[51] Int. Cl.$^2$ ........................... C08J 3/20; C08K 3/04; C08K 5/01
[52] U.S. Cl. ............................ 260/33.6 AQ; 260/34.2; 260/42.55; 260/761; 260/763

[58] Field of Search ........... 260/33.6 AQ, 34.2, 42.55, 260/760, 763, 761

[56] References Cited

U.S. PATENT DOCUMENTS

| 3,654,218 | 4/1972 | Clas et al. | 260/42.55 |
| 3,767,605 | 10/1973 | Gerlicher | 260/23.7 A |

*Primary Examiner*—Donald E. Czaja
*Assistant Examiner*—H. H. Fletcher
*Attorney, Agent, or Firm*—Oblon, Fisher, Spivak, McClelland & Maier

[57] ABSTRACT

Rubber crumbs are imparted with non-tackiness or antiblocking property by treating the crumbs with a mixture of a rubber latex and an aqueous carbon black slurry in the presence of a coagulant.

13 Claims, No Drawings

METHOD FOR THE PREPARATION OF POWDERED RUBBER

BACKGROUND OF THE INVENTION

1. Field of the Invention

This invention relates to a method for preparing powdered rubber. More particularly, it relates to a method for preparing powdered rubber with non-tackiness by treating a coagulated rubber with a carbon black-rich mixture of a rubber latex and an aqueous carbon black slurry in the presence of a coagulant.

2. Description of the Prior Art

There has been known and reduced into practice a method which comprises coagulating a mixture of a rubber latex, an oil emulsion and an aqueous carbon black slurry, dewatering and drying the coagulated rubber to obtain lumpy rubber, pressing the lumpy rubber in the form of bales, and packing the bales with polyethylene film. In this method, it is essentially required to form the lumpy rubber into bales and to pack each of the bales with polyethylene film since the coagulated rubber lumps are sticked with one another during dewatering and drying operations and also during storage or transportation to cause blocking. When the baled rubber is employed in a rubber processing work such as of tire manufacturing, it must be broken into pieces for automatic weighing purpose. Accordingly, if the rubber of the class mentioned above is supplied in the form of powder, not only the labor and time required for breaking the baled rubber into pieces in the rubber processing work can be saved and accordingly the automatic weighing operation is made easy, but also the powdered rubber can be dry blended with sulfur, an antioxidant, a cure accelerator, and other additives and directly fed to an extruder. This makes it possible to simplify the steps of producing rubber products to a considerable extent. Thus, the powdering of rubber has a significant meaning from an industrial point of view.

In the powdering of rubber, it is the common practice to treat rubber crumbs with an antiblocking agent so as to prevent the rubber crumbs from being sticked with one another. A number of methods for the preparation of non-tacky powdered rubber have been proposed, including a method wherein SBR is treated with powder of a resinous aromatic vinyl polymer to obtain non-cohesive granules of SBR, a method using talc for surface coverings, a method using metal salts or metal oxides for mixing with rubber to impart non-tackiness to the rubber, a method using polyethylene, polypropylene or the like to form dry coatings on rubber crumb surfaces, and the like methods. However, these powdering methods or techniques involve many problems that dust is undesirably produced during the powdering treatment and that a relatively large amount of powder material is required to impart an antiblocking property to rubber crumbs, giving an adverse influence on physical properties of the rubber.

Further, there is known a method wherein a crumb slurry containing an uncoagulated rubber latex is added and treated with an aqueous carbon black slurry to antiblock the crumbs U.S. Pat. No. 3,767,605). However, the method is encountered with difficulties that it is hard to exactly control the amount of the residual uncoagulated rubber latex and that the aqueous carbon black slurry must be limited in amount, so that it is difficult to impart the antiblocking property to the crumbs in a stable manner.

Under these circumstances, we have made an extensive study of a method for conveniently producing powdered rubber from a rubber latex with or without addition of carbon black and oil. As a result, it has been found that the blocking tendency of powdered rubber can be prevented by covering surfaces of crumbs with a carbon black-rich mixture of rubber and carbon black, while maintaining, as it is, the shape of crumbs formed upon coagulating a rubber latex.

SUMMARY OF THE INVENTION

It is an object of the present invention to provide a method for the preparation of non-tacky powdered rubber.

It is another object of the present invention to provide a method for the antiblocking of rubber crumbs without use of any antiblocking agent of a specific type.

The above objects can be achieved by a method for the preparation of powdered rubber which comprises the steps of: (a) adding a coagulant to a rubber latex to obtain crumbs of the rubber; (b) mixing the crumbs with a rubber latex and an aqueous carbon black slurry in an amount of 100 – 1000 parts by weight of carbon black per 100 parts by weight of the rubber component in the second-mentioned rubber latex; (c) treating the resulting mixture in the presence of a coagulant; and (d) separating the treated crumbs from the serum and drying the separated crumbs.

DETAILED DESCRIPTION OF THE PREFERRED EMBODIMENTS

In the first step (a) of the method of the invention, a rubber latex is added with a coagulant to obtain crumbs of the rubber, which are fine particles of coagulated rubber. The rubber latex useful in the present invention is readily obtainable by subjecting to an emulsion polymerization a monomer such as butadiene, butadiene-styrene, butadiene-acrylonitrile, butadiene-isoprene, isoprene, chloroprene, piperylene (i.e., 1,3-pentadiene), 2,3-dimethylbutadiene, 1-chlorobutadiene or a mixture thereof. Of these, the latices of a butadiene rubber, a butadiene-styrene copolymer rubber, a butadiene-acrylonitrile copolymer rubber and a chloroprene rubber are preferred. In some cases, a natural rubber latex, a latex obtained by emulsifying a rubber solution prepared by solution polymerization or a recovered solid rubber in water by means of an emulsifier such as carboxylic acid soap may be also used in the practice of the invention.

In the first step (a), the rubber latex may be mixed with an aqueous carbon black slurry in an amount of 0 – 200 parts by weight of carbon black (hereinlater referred to simply as CB) per 100 parts by weight of rubber component (the amount of CB will be hereinlater expressed in terms of PHR). Preferably, the amount of the CB is in the range of 30 – 200 PHR. Various kinds of CB may be used to form the aqueous CB slurry. The aqueous CB slurry can be prepared by various methods, preferably by a method using a colloid mill, a centrifugal pump or the like by which CB particles are dispersed in water to an extent as uniform as possible. The CB concentration in the aqueous slurry is generally in the range of 4 – 15%, preferably 6 – 10%.

Though the mixing of the rubber latex with the aqueous CB slurry will suffice to be effected in a coagulation tank, introduction of the mixture obtained after pre-mixing, into the coagulation tank is effective in creaming the rubber latex. Further, addition of a monovalent salt such as sodium chloride, potassium chloride or the like to the rubber latex is effective in a sense that the coagulation operation is feasible in a stable state of creaming the rubber latex.

In the practice of the invention, the rubber latex or the mixture of a rubber latex and an aqueous CB slurry may be further mixed with an oil in the first step (a). The oils usable in the invention are preferred to be those which are generally employed as extender oils such as aromatic oil, naphthenic oil, paraffinic oil, etc. The oil should preferably be added to the rubber latex after having been formed into an aqueous emulsion by the use of carboxylic acid soap. The amount of the oil is generally in the range less than 100 PHR, preferably 1 – 80 PHR. Use of an oil makes it possible to employ CB in an amount somewhat greater than in cases where no oil is used.

If necessary, zinc oxide, stearic acid, sulfur, a cure accelerator, an antioxidant and other additives may be added to the rubber latex.

In the first step (a) of the invention, a coagulant is used to produce crumbs of the rubber. The rubber latex or a mixture containing the rubber latex as its main component is coagulated. Suitable coagulants are, for example, acids including inorganic acids such as sulfuric acid, hydrochloric acid, phosphoric acid, etc., and organic acids such a acetic acid, formic acid, etc. The amount of the acid coagulant is sufficient to render the latex mixture acidic generally in a pH range of 1 – 6, preferably 3 – 5. Apart from the acid coagulants there may be also used inorganic salt coagulants such as aluminum chloride, aluminum sulfate, calcium nitrate, calcium chloride, zinc sulfate, magnesium sulfate, etc. In addition, water-soluble polymeric materials such as polyethylenepolyamine, polyimine, polyacrylamide and the like may be used as a coagulating assistant in combination with the coagulant.

The addition of the coagulant to the latex system results in coagulation of fine particles or crumbs of rubber per se or, in some case, a mixture of rubber with carbon black, oil and the like. The size of the crumb particles is generally below 5 mm, preferably below about 1 mm. As a matter of course, the final powdered rubber product obtained according to the method of the invention has also such a particle size as mentioned above.

Then, in the second step (b), the crumb particles obtained in the first step (a) is added and mixed with a mixture of a rubber latex and an aqueous CB slurry having a high proportion of CB. The mixing proportion or ratio of CB to rubber component in this rubber latex is generally in the range of 100 – 1000 PHR, preferably 200 – 800 PHR. With the CB ratio below 100 PHR, the blocking tendency of the crumb particles can not be prevented satisfactorily. While, when CB is used in an amount over 1000 PHR, the CB in excess over the amount required to encase or cover the entire surfaces of the crumbs therewith is introduced into the coagulation tank, so that fine particles of free CB or of a mixture of an extremely large proportion of CB and only a small proportion of rubber are produced apart from the crumbs. These particles remain in the slurry and accordingly an additional step is required to collect the remaining particles.

The amount of the rubber used in the step (b) is generally in the range of 0.5 – 50% by weight, preferably 1 – 30% by weight, of the rubber component of the crumbs. Likewise, the amount of the CB used in the step (b) is generally in the range of 10 – 100% by weight, preferably 20 – 60% by weight, of the total amount of CB contained in the final powdered rubber.

The rubber latex mixed with a high proportion of the CB for coagulation in the second step (b) is preferred to be the same kind of the rubber latex used in the first step (a), though different kinds of rubber latices may be used. The CB used in the aqueous CB slurry may be that which is usable in the first step (a). In this connection, when CB is used together with a rubber latex in the first step (a), the CB in the second step (b) is preferred to be the same kind of the CB used in the first step (a) though different kinds of CB may be employed.

In the third step (c), the mixture obtained in the second step (b) is again treated with a coagulant. The coagulant for coagulating the CB-rich mixture, it is sufficient to use the acid coagulant remaining in the slurry. If required, a fresh coagulant may be added to the coagulation system. By the treatment with the coagulant, the CB-rich mixture is coagulated on surfaces of the crumb particles formed in the first step (a) and to encase the crumb particles therewith. When the coagulant is freshly added, an acid coagulant is preferably used similarly to the case of the first step (a) and its amount is sufficient to render the coagulation system acidic in the pH range of 1 – 6. Upon the encasement of crumb particles by coagulation with the CB-rich mixture, the CB-rich mixture may be added directly to the crumb-containing slurry. Alternatively, the crumb-containing slurry may be first subjected to filtration to separate crumb particles therefrom, to which the CB-rich mixture and, if necessary, water are added for coagulation. In the latter case, a coagulant must be freshly added to the coagulation system.

To encase surfaces of the crumb particles each with one layer of the CB-rich mixture is sufficient to impart a satisfactory antiblocking property to the particles. Needless to say, the encasement with a plurality of layers gives a greater effect on the antiblocking property. In this case, though the proportion of CB in the CB-rich mixture may be changed in the respective layers, it is important that an outermost layer should have a CB proportion equal to or greater than that of the inner layer and also have the most high proportion of the CB among the plurality of layers.

As described hereinbefore, though it is not necessarily required in the first step (a) that the rubber latex is added with an aqueous CB slurry, 0 – 200 PHR of the CB may be used in some case. When the CB is used in the first step (a) of coagulating the rubber latex, the mixing ratio of the aqueous CB slurry to the rubber latex in the second step (b) is required to be greater than the mixing ratio of the CB in the crumb particles so as to produce a more pronounced effect on the antiblocking property. For instance, when the crumb particles contain 150 PHR of CB, the mixing ratio in the second step (b) should have the CB ratio above 150 PHR.

It is preferred that, prior to the mixing of the crumb slurry obtained in the first step (a) with a mixture of a rubber latex and an aqueous CB slurry, the crumb slurry is added with an alkaline substance to adjust its pH to 6 – 9, if necessary. The pH adjustment ensures a uniform encasing treatment of the crumb particles with the CB-rich mixture. In addition, the pH adjustment is advantageous in that free CB is prevented from being left in the aqueous serum separated after the encasing treatment in the fourth step (d). Examples of the alkaline substances include sodium hydroxide, potassium hydroxide, magnesium hydroxide, potassium carbonate, sodium carbonate, calcium carbonate, magnesium carbonate, sodium bicarbonate, sodium acetate, ammonia and the like.

In the fourth step (d), the crumb particles treated or encased with the CB-rich mixture in the third step (c) are separated from the aqueous serum and dried. That is, the crumb particles encased or covered with the CB-rich mixture is aftertreated by the usual manner, i.e., the particles are filtered to separate from the aqueous serum, washed with water and again filtered. The filtration may be effected by any known filtering means such as a screen, wire mesh or rotary plate filter, the Nutsche funnel, a centrifugal dewatering machine or the like. The thus separated crumb particles are then dried to obtain a powdered rubber product. This powdered rubber product shows no tendency to blocking during the drying operation, so that various kinds of known drying apparatus can be used including a rotary dryer, a fluid-bed dryer, a vibratory dryer, a flash dryer, a heat elements-equipped dryer, a band dryer, a spray dryer and the like.

It should be noted that the second and third steps of the method of the invention are feasible at the same time and that though the first through fourth steps are preferred to be conducted continuously, though the method of the invention is not necessarily limited to the continuous process. As described hereinbefore, the method of the invention comprises the essential four steps, and may further include additional or repeating steps. For example, the method is conveniently feasible by a series of the following steps; first step (a) → second step (b) → third step (c) → second step (b) → third step (c) → fourth step (d). By repeating the second and third steps two times as indicated above, powdered rubber with excellent properties can be produced.

The powdered rubber product obtained according to the method of the invention is, as a matter of course, compressed by dead load imposed on itself during storage or transportation, but is free from blocking tendency even under such compressed conditions. The powdered rubber product obtained according to the method of the invention gives a good result with regard to blocking property and other physical properties since it is comprised of crumb cores made of a mixture of rubber, carbon black and, if required, oil, and each covered with an antiblocking encasing material which is completely different in composition from encasing additives conventionally employed in known powdering methods and which includes the same constituents as the crumb cores. This is one of the prominent features of the invention. Another feature of the invention is that the powdered rubber product of the invention can be massproduced on an industrial scale and that the production of the powdered rubber is readily feasible by the use of facilities existing in the factory of producing a mixture of rubber and CB.

The present invention will be particularly illustrated by way of the following examples. For comparative purpose, comparative examples will be also shown. In the examples and comparative examples, parts and percentages are by weight, respectively, unless otherwise indicated. The blocking test using powdered rubber obtained after drying the effected by the following method.

15 g of powdered rubber was placed in a hollow cylinder with an inner diameter of 35 mm and was applied with a weight of 0.25 kg/cm², followed by allowing to stand for 5 min. Then, the weight and cylinder were removed to obtain a powdered rubber mold. Then, a weight was placed on the rubber mold while stepwise increasing the weight until the mold was deformed. The degree of antiblocking was expressed in terms of the weight index where the powdered rubber mold was deformed. That is, the degree of blocking was expressed as 0 when the mold was deformed without addition of load, as 1 when deformed under a load of 100 g, as 2 when deformed under a load of 200 g, and so forth.

EXAMPLE 1

169 g of a SBR latex (having a styrene/butadiene weight ratio = 23/77 and a rubber content of 22.5 %) was introduced into a 2 l container equipped with an agitator together with 313 g of an aqueous 8 % slurry of CB (Diablack SH, registered trade name of Mitsubishi Chemical Industries Ltd.) and 36 g of an oil emulsion obtained by emulsifying 25 g of aroma oil by means of tall oil soap, followed by agitating for 3 min and then adding 12 ml of an aqueous 5 % sulfuric acid solution to form crumb particles (containing 66 PHR of the CB).

To the crumb-containing acidic slurry was added a mixture of 9 g of the same kind of the SBR latex as used above and 100 g of the same kind of the aqueous CB slurry as used above. As a result, a layer of the carbon black-rich mixture having a CB content of 400 PHR was formed by coagulation on surfaces of each of crumb particles. The resulting crumb particles were separated by filtration, washed with water and dried in a dryer of 80° C for 3 hours to obtain powdered rubber. During the drying, no tendency of the particles to blocking was observed. The blocking test revealed that the degree of blocking of the powdered rubber was as small as 2. The powdered rubber was comprised of 83 PHR of the CB and 63 PHR of the oil.

EXAMPLE 2

Example 1 was repeated except that, in the second coagulation step, the crumb slurry was added with, instead of the mixture (having a CB content of 400 PHR) of 9 g of the SBR latex and 100 g of the aqueous CB slurry, first a mixture of 4.5 g of the SBR latex and 40 g of the aqueous CB slurry to form a layer of a CB-rich mixture with a CB content of 320 PHR on surfaces of each of the crumb particles and then a mixture of 4.5 g of the SBR latex and 60 g of the aqueous CB slurry to further form a layer of a CB-rich mixture of a CB content of 480 PHR on the first layer of each of the crumb particles. That is, each of the crumb particles was encased or covered with the two layers of the respective CB-rich mixtures with different CB contents.

The resulting powdered rubber had a degree of blocking of 0. This means that no blocking takes place even when the powdered rubber is piled up at a height of 5 m.

EXAMPLE 3

Example 1 was repeated, similarly to Example 2, except that, in the second coagulation step, the crumb slurry was added with, instead of the mixture of 9 g of the SBR latex and 100 g of the aqueous CB slurry, a mixture of 4.5 g of the SBR latex and 16.3 g of the aqueous CB slurry two times to successively form two layers of the CB-rich mixture with a CB content of 130 PHR on surfaces of each of the crumb particles. The resulting powdered rubber had a degree of blocking of 4.

EXAMPLES 4 – 6

Example 1 was repeated using different kinds of rubber latices (i.e., polybutadiene rubber latex (PBR latex) having a rubber content of 23 %, natural rubber latex (NR latex) having a mooney viscosity $ML_{1+4} = 91$ and a rubber content of 32 %, and nitrile-butadiene rubber latex (NBR latex) having an acrylonitrile/butadiene ratio = 32/68 and a rubber content of 22.5 %) and treating conditions indicated in Table 1. The test results are shown in Table 1 below.

Table 1

| Example No. | | 4 | 5 | 6 |
|---|---|---|---|---|
| | latex | PBR | NR | NBR |
| Conditions of production of crumbs | rubber (g) | 38 | 38 | 36 |
| | CB (g) | 20 | 20*3 | 20*4 |
| | CB (PHR) | 53 | 53 | 56 |
| | oil (g) | 20 | 4 | 0 |
| | oil (PHR) | 53 | 10.5 | 0 |
| Encasing treatment conditions | rubber (g) | 2.0 | 2.0 | 4.0 |
| | rubber (%)*1 | 5.3 | 5.3 | 11.1 |
| | CB (g) | 10 | 8 | 16 |
| | CB (PHR) | 500 | 400 | 400 |
| | CB (%)*2 | 33 | 29 | 44 |
| Powdered rubber | composition | | | |
| | CB (PHR) | 75 | 70 | 90 |
| | oil (PHR) | 50 | 10 | 0 |
| | degree of blocking | 2 | 2 | 1 |

Note
*1 The term "rubber (%)" is intended to mean a percentage of the encased rubber (g) to the rubber (g) employed for the production of crumbs.
*2 The term "CB (%)" means a percentage of CB (g) in the encasing layer to the total CB (g) employed.
*3 Diablack of grade I was used as CB.
*4 Diablack of grade G was used as CB.

EXAMPLE 7

The general procedure of Example 1 was repeated except that, instead of adding a CB-rich mixture directly to the coagulated crumb slurry, the crumb particles were separated by filtration, washed with water and again placed in a 2 l container with an agitator, to which a mixture of 9 g of a SBR latex and 100 g of an aqueous CB slurry and further 7 ml of an aqueous 8 % sulfuric acid solution were added, respectively, to allow the CB-rich mixture with a CB content of 400 PHR to be coagulated on surfaces of each of the crumb particles. The treated crumb particles showed no tendency to blocking during drying, with a degree of blocking of 1.

EXAMPLES 8 – 14

Example 1 was repeated using such crumb production and encasing treatment conditions as indicated in Table 2 thereby to obtain seven kinds of powdered rubbers. It will be noted that, in Example 10, the encasing treatment was repeated two times similarly to the case of Example 2. The test results are summarized in Table 2 below.

Table 2

| Example No. | | 8 | 9 | 10 | 11 | 12 | 13 | 14 |
|---|---|---|---|---|---|---|---|---|
| | latex | SBR | SBR | SBR | SBR | SBR | SBR | SBR |
| crumb production conditions | rubber (g) | 38 | 38 | 38 | 40 | 36 | 32 | 28 |
| | CB (g) | 29 | 17 | 17 | 31 | 17 | 17 | 9 |
| | CB PHR) | 76 | 45 | 45 | 79 | 47 | 53 | 32 |
| | oil (g) | 25 | 25 | 25 | 25 | 25 | 25 | 25 |
| | oil (PHR) | 66 | 66 | 66 | 63 | 69 | 78 | 89 |
| encasing treatment conditions | rubber (g) | 2 | 2 | 1+1 | 0.4 | 4 | 8 | 12 |
| | rubber (%) | 5.3 | 5.3 | 1.0 | 11.1 | 25.3 | 4.3 | 5.3 |
| | CB (g) | 4 | 16 | 8+8 | 3.2 | 16 | 16 | 24 |
| | CB (PHR) | 200 | 800 | 800/800 | 800 | 400 | 200 | 200 |
| | CB (%) | 12 | 48 | 48 | 9 | 48 | 48 | 73 |
| powdered rubber | composition | | | | | | | |
| | CB (PHR) | 83 | 83 | 83 | 87 | 83 | 83 | 83 |
| | oil (PHR) | 63 | 63 | 63 | 63 | 63 | 63 | 63 |
| | degree of blocking | 3 | 1 | 0 | 3 | 2 | 4 | 5 |

EXAMPLE 15 (Continuous Process)

4.24 l/hr (4.22 kg/hr) of a SBR latex, 12.24 l/hr (12.5 kg/hr) of an aqueous 5 % CB slurry and 0.89 l/hr of an oil emulsion obtained by emulsifying aroma oil with tall oil soap were continuously fed to a mixing tank, respectively. 17.37 l/hr (17.61 kg/hr) of the resulting mixture was in turn fed from the mixing tank to a first coagulation tank, to which were simultaneously fed 2.1 l/hr of an aqueous 0.5 % sulfuric acid solution and a small amount of a polyamine compound serving as a coagulating assistant. As a result, crumb particles (containing 66 PHR of CB and 66 PHR of oil) were produced by coagulation. The crumb slurry was then fed to a second coagulation tank, to which 0.22 l/hr (0.22 kg/hr) of a SBR latex and 4.24 l (4 kg/hr) of an aqueous 5 % CB slurry were added, with the result that surfaces of the crumb particles were encased with a mixture of CB and rubber having a CB content of 400 PHR. Then, Example 1 was repeated to filter, wash with water and dry the encased crumb particles to obtain powdered rubber. The thus obtained powdered rubber had a degree of blocking of 0 and contained 83 PHR of CB and 63 PHR of oil.

EXAMPLES 16 – 22

Example 1 was repeated using several kinds of rubber latices and the crumb production and encasing treatment conditions indicated in Table 3, thereby to obtain seven kinds of powdered rubbers. In Examples 17 and 18, the encasing treatment was repeated two times. The experimental results are shown in Table 3.

Table 3

| Example No. | | 16 | 17 | 18 | 19 | 20 | 21 | 22 |
|---|---|---|---|---|---|---|---|---|
| | latex | SBR | SBR | SBR | PBR | NR | NBR | SBR |
| crumb production conditions | rubber (g) | 38 | 38 | 38 | 38 | 38 | 36 | 38 |
| | CB (g) | 0 | 0 | 0 | 10*1 | 10*2 | 10*3 | 0 |
| | CB (PHR) | 0 | 0 | 0 | 26 | 26 | 28 | 0 |

Table 3-continued

| Example No. | | 16 | 17 | 18 | 19 | 20 | 21 | 22 |
|---|---|---|---|---|---|---|---|---|
| | latex | SBR | SBR | SBR | PBR | NR | NBR | SBR |
| encasing treatment conditions | oil (g) | 0 | 0 | 0 | 4 | 4 | 0 | 0 |
| | oil (PHR) | 0 | 0 | 0 | 10.5 | 10.5 | 0 | 0 |
| | rubber (g) | 2 | 1+1 | 1+1 | 2 | 2 | 4 | 2 |
| | rubber (%) | 5.3 | 5.3 | 5.3 | 5.3 | 5.3 | 11.1 | 5.3 |
| | CB (g) | 8 | 3.2+4.8 | 1.3+1.3 | 10 | 8 | 16 | 8 |
| | CB (PHR) | 400 | 320/480 | 130/130 | 500 | 400 | 400 | 400 |
| | CB (%) | 100 | 100 | 100 | 50 | 44 | 62 | 100 |
| powdered rubber | composition CB (PHR) | 20 | 20 | 6.5 | 50 | 45 | 65 | 20 |
| | oil (PHR) | 0 | 0 | 0 | 10 | 10 | 0 | 0 |
| | degree of blocking | 3 | 1 | 5 | 1 | 1 | 1 | 2 |

*1 and *2Diablack of grade I was used as CB.
*3Diablack of grade G was used as CB.

EXAMPLE 23

169 g of a SBR latex (having a styrene/butadiene weight ratio = 23/77 and a rubber content of 22.5 %) was introduced into a 2 l container equippped with an agitator together with 313 g of an aqueous 8 % slurry of CB (Diablack SH, registered trade name of Mitsubishi Chemical Industries Ltd.) and 36 g of an oil emulsion obtained by emulsifying 25 g of aroma oil by means of tall oil soap, followed by agitating for 3 min and adding 12 ml of an aqueous 5 % sulfuric acid solution to form a crumb slurry (containing 66 PHR of the CB and 66 PHR of the oil).

To the coagulated mixture slurry containing the crumb particles and having an acidity of pH = 4 was added 10 ml of an aqueous 5 % sodium hydroxide solution to adjust the pH of the slurry to 7. Then, a mixture of 9 g of the same kind of the SBR latex as used above and 100 g of the aqueous CB slurry was added to the thus adjusted slurry, followed by agitating for 5 min. To the slurry was further added 10 ml of an aqueous 5 % sulfuric acid solution so that the CB-rich mixture having a CB content of 400 PHR was allowed to be coagulated on surfaces of the crumb particles. The thus treated crumb particles were separated by filtration, washed with water and dried in a dryer of 80° C for 3 hours to obtain powdered rubber. No free CB was recognized in the aqueous serum obtained after the separation of the crumb particles. Further, no tendency to blocking of the treated crumbs was observed. The powdered rubber had a degree of blocking of 2 and was excellent in quality. The powdered rubber contained 83 PHR of CB and 63 PHR of oil.

EXAMPLES 24 - 38

Example 23 was repeated using such rubber latices, amounts of oils and CB, kinds and amounts of alkaline substances, CB contents in the encasing layer(s), and rubber contents of the encasing layer as indicated in Table 4 thereby to obtain powdered rubbers. The experimental results are shown in Table 4 below.

Table 4

| Example No. | | 23 | 24 | 25 | 26 | 27 |
|---|---|---|---|---|---|---|
| | rubber latex | SBR | SBR | SBR | SBR | SBR |
| | CB (PHR) | 66 | 66 | 66 | 66 | 80 |
| | oil (PHR) | 66 | 66 | 66 | 66 | 66 |
| production conditions | aqueous 5 % coagulant solution (ml) | H$_2$SO$_4$ 12 | H$_2$SO$_4$ 12 | H$_2$SO$_4$ 12 | H$_2$SO$_4$ 12 | H$_2$SO$_4$ 12 |
| | alkali | NaOH | KOH | NaOH | NaOH | NaOH |
| | 5 % alkali (ml) | 10 | 10 | 6 | 12 | 10 |
| | pH | 7 | 7 | 6 | 9 | 7 |
| | CB content in encasing layer (PHR) | 400 | 400 | 400 | 400 | 130 |
| | rubber content in encasing layer (%) | 5.3 | 5.3 | 5.3 | 5.3 | 5.3 |
| | CB content in encasing layer (%) | 24 | 24 | 24 | 24 | 8 |
| | 5 % sulfuric acid (ml) | 10 | 10 | 6 | 12 | 10 |
| powdered rubber | composition CB (PHR) | 83 | 83 | 83 | 83 | 83 |
| | oil (PHR) | 63 | 63 | 63 | 63 | 63 |
| | degree of blocking | 2 | 2 | 2 | 2 | 5 |

| 28 | 29 | 30 | 31 | 32 | 33 | 34 | 35 | 36 | 37 | 38 |
|---|---|---|---|---|---|---|---|---|---|---|
| SBR | SBR | SBR | PBR | NR | NBR | SBR | SBR | SBR | SBR | SBR |
| 45 | 47 | 79 | 53 | 53 | 56 | 53 | 32 | 66 | 22 | 0 |
| 66 | 69 | 63 | 53 | 10.5 | 0 | 78 | 89 | 66 | 0 | 0 |
| H$_2$SO$_4$ 12 | H$_2$SO$_4$ 12 | H$_2$SO$_4$ 12 | H$_2$SO$_4$ 12 | H$_2$SO$_4$ 12 | H$_2$SO$_4$ 12 | H$_2$SO$_4$ 12 | H$_2$SO$_4$ 12 | Al$_2$(SO$_4$)$_3$ 10 | Al$_2$(SO$_4$)$_3$ 10 | Al$_2$(SO$_4$)$_3$ 10+20% NaCl 150ml |
| NaOH | NaOH | NaOH | NaOH | NaOH | NaOH | NaOH | NaOH | NaOH | NaOH | NaOH |
| 10 | 10 | 10 | 10 | 10 | 10 | 10 | 10 | 5 | 5 | 5 |
| 7 | 7 | 7 | 7 | 7 | 7 | 7 | 7 | 7 | 7 | 7 |
| 800 | 400 | 400 | 500 | 400 | 400 | 200 | 200 | 400 | 395 | 400 |
| 5.3 | 11.2 | 1.0 | 5.3 | 5.3 | 11 | 25 | 43 | 5.3 | 2.1 | 1.0 |
| 48 | 48 | 9 | 33 | 29 | 44 | 48 | 73 | 24 | 26 | 100 |
| 10 | 10 | 10 | 10 | 10 | 10 | 10 | 10 | 10 | 5 | 5 |
| 83 | 83 | 87 | 75 | 70 | 90 | 83 | 83 | 83 | 30 | 4 |

Table 4-continued

| 63 | 63 | 63 | 50 | 10 | 0 | 63 | 63 | 63 | 0 | 0 |
|----|----|----|----|----|---|----|----|----|---|---|
| 2  | 2  | 3  | 2  | 2  | 1 | 4  | 5  | 2  | 3 | 2 |

EXAMPLE 39

Example 7 was repeated using 5 ml of an aqueous 5 % calcium chloride solution instead of 10 ml of the aqueous 5 % sulfuric acid solution in the encasing treatment step. The resulting powdered rubber had a degree of blocking of 3 and contained 83 PHR of CB and 63 PHR of oil.

COMPARATIVE EXAMPLE 1

The crumb slurry of Example 1 was not treated with the CB-rich mixture and the crumb particles were separated from the slurry and dried in the same manner as in Example 1. During the course of the drying, the crumb particles were blocked with one another in a slight degree. The resulting powdered rubber had a degree of blocking as poor as 10.

COMPARATIVE EXAMPLE 2

The crumb slurry obtained in Example 1 was added with 20 g of an aqueous CB slurry alone (having a CB content of 6 % based on the total amount of CB) without addition of a SBR latex so as to cover the crumb surfaces with the CB-rich mixture. However, the surfaces were not encased with the CB satisfactorily. 1 -2 % of the added CB remained in the aqueous serum in the form of free CB. Further, fine crumb particles (having a CB content of 40 – 60 %) below 100 mesh size were undesirably produced in an amount of 2 – 4 %. Thus, an additional step was required to collect the free CB from the aqueous serum obtained after separation of the crumbs. The encased crumb particles were separated and dried in the same manner as in Example 1 to obtain powdered rubber. The thus obtained powdered rubber had a poor degree of blocking of 7.

COMPARATIVE EXAMPLE 3

Example 1 was repeated except that, in the second coagulation step, a mixture of 9 g of a SBR latex and 300 g of an aqueous CB slurry was used instead of the mixture (having a CB content of 400 PHR) of 9 g of the SBR latex and 100 g of the aqueous CB slurry so as to coagulate 1200 PHR of the CB-rich mixture on the crumb surfaces, thereby to obtain powdered rubber. The thus obtained powdered rubber had an excellent degree of blocking of 2. However, upon coagulating the CB-rich mixture on the crumb surfaces, part of the added CB was left in the coagulation serum in the form of free CB without combining with the rubber. Accordingly, an additional step of treating the waste liquor was required to remove the free CB from the serum.

What is claimed is:

1. A method for preparing powdered rubber comprising the steps of: (a) adding a coagulant to a rubber latex to obtain crumbs of the rubber (b) mixing said crumbs with a rubber latex and an aqueous carbon black slurry in an amount of 100 – 1000 parts by weight of carbon black per 100 parts by weight of the rubber component in the second-mentioned rubber latex; said weight of rubber component in the second conventional rubber latex being 0.5 – 50 wt. % of the rubber component of said crumbs from set (a), (c) treating the resulting mixture in the presence of a coagulant; and (d) separating the thus treated crumbs from the serum and drying the separated crumbs.

2. A method according to claim 1, wherein the coagulation of the first-mentioned rubber latex in the step (a) is effected in the presence of carbon black.

3. A method according to claim 2, wherein said carbon black is present in an amount of 30 – 200 parts by weight per 100 parts by weight of the rubber component.

4. A method according to claim 2, wherein said carbon black is used in the state of an aqueous slurry.

5. A method according to claim 1, wherein the coagulation of the first-mentioned rubber latex in the step (a) is effected in the presence of an oil.

6. A method according to claim 5, wherein said oil is present in an amount of 1 – 80 parts by weight per 100 parts by weight of the rubber component.

7. A method according to claim 5, wherein said oil is used in the state of an emulsion.

8. A method according to claim 1, wherein said crumbs obtained in the step (a) are neutralized with an alkaline substance prior to the step (b).

9. A method according to claim 1, wherein the amount of the carbon black used in the step (b) is in the range of 10 – 100 % by weight of the total amount of the carbon black contained in the final powdered rubber product.

10. A method according to claim 1, wherein said coagulant in the step (a) is an acid.

11. A method according to claim 1, wherein the crumb slurry obtained in the step (a) has a pH in the range of 1 – 6.

12. A method according to claim 1, wherein both of said rubber latices are selected from the group consisting of styrene-butadiene copolymer rubber, natural rubber, polybutadiene rubber and nitrile-butadiene copolymer rubber.

13. A method according to claim 1, wherein said coagulant in the step (c) is an acid.

* * * * *